US012036168B2

(12) United States Patent
Cowan et al.

(10) Patent No.: US 12,036,168 B2
(45) Date of Patent: Jul. 16, 2024

(54) TRANSFER MATTRESS

(71) Applicant: GBUK Group Limited, Selby (GB)

(72) Inventors: Joseph Cowan, Selby (GB); Ross Allsopp, Selby (GB); Nicholas Scard, Selby (GB)

(73) Assignee: GBUK Group Limited, North Duffield (GB)

( * ) Notice: Subject to any disclaimer, the term of this patent is extended or adjusted under 35 U.S.C. 154(b) by 0 days.

(21) Appl. No.: 17/818,408

(22) Filed: Aug. 9, 2022

(65) Prior Publication Data

US 2023/0061295 A1 Mar. 2, 2023

(30) Foreign Application Priority Data

Aug. 25, 2021 (GB) ...................................... 2112188

(51) Int. Cl.
*A61G 7/10* (2006.01)

(52) U.S. Cl.
CPC ........... *A61G 7/103* (2013.01); *A61G 7/1021* (2013.01)

(58) Field of Classification Search
USPC ............................................................ 5/682
See application file for complete search history.

(56) References Cited

U.S. PATENT DOCUMENTS 5,561,873 A * 10/1996 Weedling ............... A61G 7/103 5/81.1 R
5,655,239 A * 8/1997 Caparon ............ A61G 7/05792 5/713
5,807,290 A 9/1998 Barry
10,500,115 B2 12/2019 Weedling
2005/0193496 A1* 9/2005 Weedling ............. A61G 7/0504 5/713
2006/0213013 A1* 9/2006 Wang ................... A47C 27/081 5/713
2010/0229298 A1* 9/2010 Davis ................... A47C 20/021 5/81.1 R
2011/0271444 A1 11/2011 Davis
2013/0212806 A1 8/2013 Coppens et al.
2017/0049647 A1* 2/2017 Rigoni ............... A61G 7/05769
2019/0083341 A1 3/2019 Ulreich et al.

FOREIGN PATENT DOCUMENTS

| | | | |
|---|---|---|---|
| CN | 213311154 | U | 6/2021 |
| EP | 3162347 | A1 | 5/2017 |
| WO | 2007055824 | A2 | 5/2007 |
| WO | 2008005977 | A2 | 1/2008 |
| WO | 2008147761 | A1 | 12/2008 |
| WO | 2010082021 | A1 | 7/2010 |
| WO | 2013155461 | A1 | 10/2013 |

OTHER PUBLICATIONS

Extended European Search Report dated Jan. 18, 2023, in EP App No. EP22189406.6.
Search Report dated Feb. 7, 2022, in GB Application No. GB2112188.4, filed Aug. 25, 2021.

* cited by examiner

*Primary Examiner* — Adam C Ortiz
(74) *Attorney, Agent, or Firm* — Dunlap Codding, P.C.

(57) ABSTRACT

A patient transfer mattress includes elongate top and bottom sheets joined around their perimeter and by one or more baffles to define a cavity between the sheets. The patient transfer mattress also includes a valve in fluid communication with the cavity, and an outwards facing surface of the bottom sheet has a low friction material positioned at or adjacent to it. Methods of forming and using the patient transfer mattress are also disclosed.

20 Claims, 10 Drawing Sheets

TRANSFER MATTRESS

CROSS REFERENCE TO RELATED APPLICATIONS/INCORPORATION BY REFERENCE

This application claims benefit under 35 USC § 119(a) of GB Application No. 2112188.4, filed Aug. 25, 2021. The entire contents of the above-referenced patent application(s) are hereby expressly incorporated herein by reference.

TECHNICAL FIELD

The present disclosure relates to a transfer mattress, and in particular, to a transfer mattress which does not require a continuous airflow to move a person.

BACKGROUND

Patients in hospitals and other clinical or care settings with chronic or short-term mobility issues are often unable to move themselves between stretchers, beds and operating tables. Hospital or care home staff are frequently required to move patients for washing and cleaning, to undergo a medical procedure or to move between beds. This can result in injury for both patients and staff, particularly for heavier patients.

Mattresses for handling and moving patients which are immobile or have limited mobility are widely employed in hospitals and care settings. Existing transfer mattresses typically include two flexible material sheets with an upper sheet positioned above and stitched to a lower sheet to define a plenum chamber between the sheets. The lower sheet has multiple perforations and the mattress includes an inlet valve for inflation. In use, the patient is placed on the upper sheet, the inlet valve is connected to an air pump and the mattress is inflated. This lifts the upper sheet and patient away from the underlying surface (bed, table, stretcher etc) as the mattress inflates. Air escaping through the perforations on the lower sheet creates a cushion of air underneath the mattress, reducing contact and friction between the mattress and the underlying surface. This allows the mattress and patient to be more easily pulled across the surface. Examples of such mattresses are disclosed in EP2148593B1 and EP1942772B1.

Owing to the continuous escape of air through the perforations, these transfer mattresses require a constant flow of air during use. They must therefore remain connected to the air pump throughout the transfer procedure. Air pumps are typically noisy and bulky as they are required to sustain a constant high flow rate. Pumps may also be expensive and require regular maintenance. Where a patient is being transported to or from an MRI scan, the pump cannot be brought into room owing to the MRI magnet, thus requiring long and unwieldy tubing which may obstruct and hinder patient or staff movement. Furthermore, if the patient is being moved into a sterile environment (for example an operating theatre) then the non-sterile air within the mattress, pipe and pump increases the risk of contamination.

BRIEF DESCRIPTION OF DRAWINGS

Specific implementations of the present disclosure will now be described, by way of example only, and with reference to the accompanying drawings in which.

DETAILED DESCRIPTION

Figure 1:
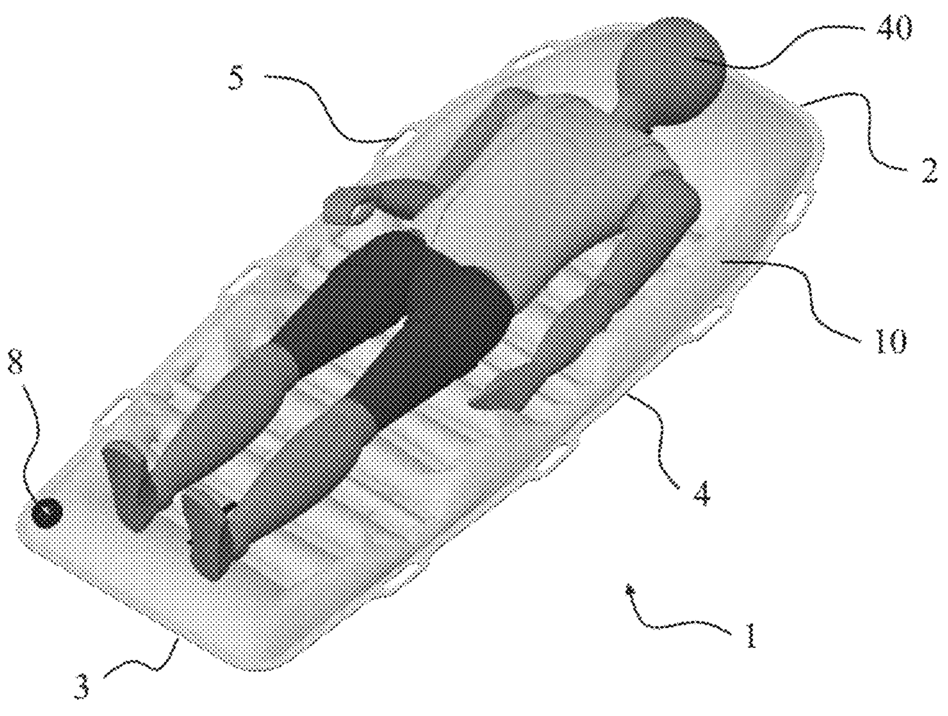
FIG. 1 is a perspective view of a first non-limiting embodiment of a transfer mattress according to the present disclosure in an inflated configuration with a patient.

The present disclosure seeks to provide a patient transfer mattress which facilitates patient transfer without requiring a continuous airflow.

Viewed from a first non-limiting aspect, the present disclosure provides an inflatable mattress for patient transfer comprising: an elongate top sheet having a head end, a foot end and a longitudinal axis extending therebetween; an elongate bottom sheet having substantially the same size as the top sheet and positioned adjacent to the top sheet, wherein the top and bottom sheets are joined around their perimeter to define a cavity between the top and bottom sheets; and a valve in fluid communication with the cavity, wherein the valve includes a port on an external surface of the mattress to enable the cavity to be inflated or deflated, wherein the inflatable mattress comprises a low friction material provided on or adjacent at least a portion of an outwards facing surface of the bottom sheet, and wherein the top and bottom sheets are joined within the cavity by one or more baffles.

The low friction material on the outwards facing surface of the bottom sheet advantageously reduces friction between the underlying substrate and the mattress, facilitating movement of the mattress across the substrate. The baffles also advantageously reduce the surface area of the bottom sheet which is in contact with the substrate when inflated, which further reduces friction between the mattress and underlying substrate. Unlike existing transfer mattresses which rely on a perforated bottom sheet and constant airflow to create an air cushion, the mattress of the present disclosure does not require continuous airflow once inflated. This eliminates the need for a high-power pump to be used continuously during patient transfer and moved with the mattress. The mattress of the present disclosure can be inflated using a lower powered pump or handheld pump.

The bottom sheet may be composed of or integrally comprise the low friction material on an outward facing surface, or the low friction material may be applied as a coating to the outwards facing surface. Alternatively, the low friction material may be provided on a separate cover sheet which is attached to and covers at least a portion of the bottom sheet. The cover sheet may be attached to the bottom sheet by an adhesive, welding, or stitching.

In certain non-limiting embodiments, the mattress has a size sufficient to support the entire body of a supine or prone patient. The mattress is elongate and has a length extending along a longitudinal axis from a head end to a foot end, and a width extending along a transverse axis perpendicular to the longitudinal axis. The mattress may have a length similar to the height of an adult. For example, the mattress may have a length of between 145 cm and 220 cm. The mattress may have a width of between 50 cm and 130 cm, e.g., about 90 cm. The width may be substantially constant along the entire length or may decrease at or towards the head and/or foot ends.

In certain non-limiting embodiments, the baffles are elongate. Where the baffles are elongate, they may extend in a generally longitudinal or transverse direction.

In certain non-limiting embodiments, the baffles are elongate and extend in a generally transverse direction. Transversely extending baffles advantageously enable the mattress to be bent or folded in a transverse direction whilst maintaining airflow throughout the cavity. The top and bottom sheets may be attached together at the baffles by stitching or welding. In certain non-limiting embodiments, the top and bottom sheets are attached together at the baffles by welding.

The mattress may comprise a set of hip joint baffles in a hip joint area. The hip joint area has a longitudinal position which corresponds approximately with the position of a patient's hips when they are lying on the mattress. In certain non-limiting embodiments, the hip joint area is positioned approximately halfway between the head end and foot end of the mattress.

The set of hip joint baffles may comprise one or more rows of transversely oriented baffles. In certain non-limiting embodiments, the rows are substantially parallel. In certain non-limiting embodiments, the set of hip joint baffles comprises 1-5 rows of transversely oriented baffles. Each row may have a transverse extent of up to 95% of the mattress width. In certain non-limiting embodiments, each row has a transverse extent of around 85% of the mattress width. In certain non-limiting embodiments, each row is aligned centrally with respect to the mattress width to define an edge region free from baffles. Each row may have a single elongate baffle or may have multiple transversely spaced baffles. For example (but not by way of limitation), each row may have between 3 and 6 transversely spaced baffles. Each baffle may have an equal or different transverse extent.

The mattress may comprise a set of knee joint baffles in a knee area. The knee area has a longitudinal position which corresponds approximately with the position of a patient's knees when they are lying on the mattress. In certain non-limiting embodiments, a longitudinal distance between the head end and the knee area is approximately three times the longitudinal distance between the foot end and the knee area.

The set of knee joint baffles may comprise one or more rows of transversely oriented baffles. In certain non-limiting embodiments, the rows are substantially parallel. In certain non-limiting embodiments, the set of knee joint baffles comprises 1-3 rows of transversely oriented baffles. Each row may have a transverse extent of up to 95% of the mattress width. In certain non-limiting embodiments, each row has a transverse extent of around 85% of the mattress width. In certain non-limiting embodiments, each row is aligned centrally with respect to the mattress width to define an edge region free from baffles. Each row may have a single elongate baffle or may have multiple transversely spaced baffles. For example, each row may have between 3 and 6 transversely spaced baffles. Each baffle may have an equal or different transverse extent.

The hip joint and knee joint baffles advantageously enable the mattress to be bent or folded in a transverse direction (i.e., in a direction substantially parallel to the rows of baffles) in the hip and/or knee regions. The mattress can therefore be used on hospital beds equipped with a moveable back rest portion, and can also be used to transfer a patient between a bed and a chair.

The mattress may comprise one or more support baffles. In certain non-limiting embodiments, the support baffles extend transversely and may have a curved shape (e.g., a concave or convex shape). In certain non-limiting embodiments, the support baffles are aligned centrally with respect to the width of the mattress and have a transverse extent of between 50% and 80% of the mattress width. This defines an edge region which is free from baffles. A curved shape prevents or limits folding of the mattress at the support baffles and may increase comfort for patients with back or chest injuries.

The support baffles increase the structural rigidity of the mattress and prevent deformation during inflation or over-inflation. In certain non-limiting embodiments, the baffles are positioned over a central section of the mattress, defining an edge region around the perimeter of the mattress which is free from baffles. When inflated, the edge region provides a raised cushion around the central section to increase the comfort and safety of the patient.

The low friction material may be selected from a group consisting of polytetrafluoroethylene (PTFE), fluorinated ethylene propylene (FEP) and silicone.

The mattress may further comprise one or more grip pads disposed on the outwards facing surface of the bottom sheet, or on an outward facing surface of the cover sheet where present. In certain non-limiting embodiments, the grip pads are composed of a high-friction material such as rubber or neoprene. The grip pads may be attached to the bottom sheet or cover sheet by stitching, welding or an adhesive.

In certain non-limiting embodiments, the grip pads are positioned adjacent or on baffles, (i.e., at or around areas where the bottom sheet is joined to the top sheet). This advantageously means that when the mattress is deflated, the grip pads will contact the substrate, thus increasing friction between the mattress and substrate. This helps to anchor the mattress when deflated and prevent slippage. This enables the mattress to be left underneath a patient during a procedure. When the mattress is inflated, the grip pads will be raised away from and will no longer contact the substrate.

In certain non-limiting embodiments, the grip pads are positioned under high mass points of the patient, i.e., the points where a patient lying on the mattress exerts greater pressure. For a supine patient this would include the shoulders, lower back, calves and heels. This helps ensure that the pressure applied by the patient keeps the mattress anchored to the bed or table when deflated. For example, the mattress may comprise two shoulder grip pads, a lower back grip pad, two calf grip pads and two heel grip pads.

The mattress may further comprise a side sheet attached to the perimeter of both the top and bottom sheets. The mattress may further comprise baffle panels within the cavity and attached to the first and second sheets at the baffles. In certain non-limiting embodiments, the top and bottom sheets are attached directly to each other around the perimeter and at the baffles without a side sheet or baffle panels. This simplifies the manufacturing process and reduces the number and length of joins between different sheets of material, thus reducing the risk of stitching/welding failure and leaks at the joins.

The top and bottom sheets may be composed of the same material or a different material. In certain non-limiting embodiments, the top and bottom sheets are composed of the same material. This advantageously increases the strength of bonding between the top and bottom sheets where they are joined together by welding. Where the top and bottom sheets are composed of the same material, the bottom sheet may have an additional coating of a low friction material on the outwards facing surface. The bottom sheet may have a greater thickness than the top sheet to provide additional protection against puncture or wear. The top and/or bottom sheets may be composed of a material selected from a group consisting of polyvinyl chloride, polyethylene, polypropylene, polyurethane, thermoplastic polyurethane and synthetic or natural rubber. In certain non-limiting embodiments, the top and bottom sheets are composed of a thermoplastic polyurethane.

The top sheet may further comprise a coating over an upper surface. The coating may be in the form of flocking, or may be a soft material coating such as felt matting to increase patient comfort. Alternatively, the coating on the upper surface may be a waterproof or non-absorbent surface which can be easily cleaned and/or disinfected. The coating on the upper surface may be a nylon coating.

The valve may be located between the top and bottom sheets (i.e., sandwiched between the two sheets along the perimeter of the mattress) or may be provided in the top or bottom sheet. In certain non-limiting embodiments, the valve is provided in the top sheet for ease of access. The top sheet may include additional reinforcing material around the valve to reduce the risk of tearing or damage as an inflation pipe is attached or detached. In certain non-limiting embodiments, the valve is positioned towards a foot end corner of the top sheet.

The mattress may further comprise one or more handles arranged around a perimeter to aid staff handling or moving the mattress when in use. The handles may be stitched or welded onto the mattress or may be formed integrally with the top and/or bottom sheets. There may be any number of handles spaced around the perimeter of the mattress. The handles may be positioned on the long edges of the mattress, or on the short edges of the mattress, or on both. In certain non-limiting embodiments, there are between 3 and 6 handles on each long edge and between 0 and 2 handles on each short edge. In certain particular (but non-limiting) embodiments, there are 4 handles on each long edge and no handles on each short edge. Alternatively, the handles may comprise one or more elongate strips which extend along an edge of the mattress and are attached to the mattress at multiple points to define one or more grippable handles.

The mattress may further comprise one or more pairs of restraining strap loops provided around a perimeter of the mattress to receive and attach restraining straps. One or more restraining straps may be provided which are attachable to the loops to secure a patient during transport to reduce the risk of a patient falling from the mattress.

Viewed from a second non-limiting aspect, the present disclosure provides a method of forming an inflatable mattress for patient transfer, comprising: taking two similarly sized sheets of flexible rubber or thermoplastic material; applying a low-friction coating to one side of a first sheet to form a bottom sheet; implanting a valve into a second sheet to form a top sheet; overlaying the top sheet on the bottom sheet such that the coated side of the bottom sheet is oriented away from the top sheet; cutting both sheets to a desired shape; and welding the top and bottom sheets together around a perimeter and at one or more baffles to form a cavity between the two sheets.

The perimeter may include one or more handle portions and the cutting step may include cutting one or more handle holes into the first and second sheets.

The perimeter may include one or more strap loops and the cutting step may include cutting one or more strap holes into the first and second sheets. The method may further comprise attaching restraining straps to the strap loops.

The two sheets may be welded together by a laser, friction, high-frequency or ultrasonic welding process. The two sheets may also be welded together chemically, using a solvent or an adhesive. In certain non-limiting embodiments, the two sheets are welded using high-frequency or ultrasonic welding.

Viewed from a third non-limiting aspect, the present disclosure provides a method for forming an inflatable mattress for patient transfer, comprising: taking two similarly sized sheets of flexible rubber or thermoplastic material; implanting a valve into a first of the two sheets to form a top sheet; overlaying the top sheet and the second sheet; cutting both sheets to a desired shape; welding the two sheets together around a perimeter and at one or more baffles to form an inflatable pad having a cavity between the two sheets; positioning a cover sheet comprising a low friction material over an outwards facing surface of the second sheet; and stitching the cover sheet to the inflatable pad around a perimeter and at the one or more baffles.

The method may further comprise attaching one or more handle strips around the perimeter.

The method may further comprise attaching one or more grip pads to an outward facing surface of the cover sheet.

Viewed from a fourth non-limiting aspect, the present disclosure provides a method for moving a patient, comprising: placing a mattress as hereinbefore described on a substrate; positioning a patient on the top sheet of the mattress with their head towards the head end and their feet towards the foot end; inflating the cavity by forcing air in through the valve; repositioning the mattress and patient by pulling or pushing the mattress across the substrate or between the substrate and another surface; and opening the valve to deflate the mattress once the patient has been moved to the desired position.

Figure 2:
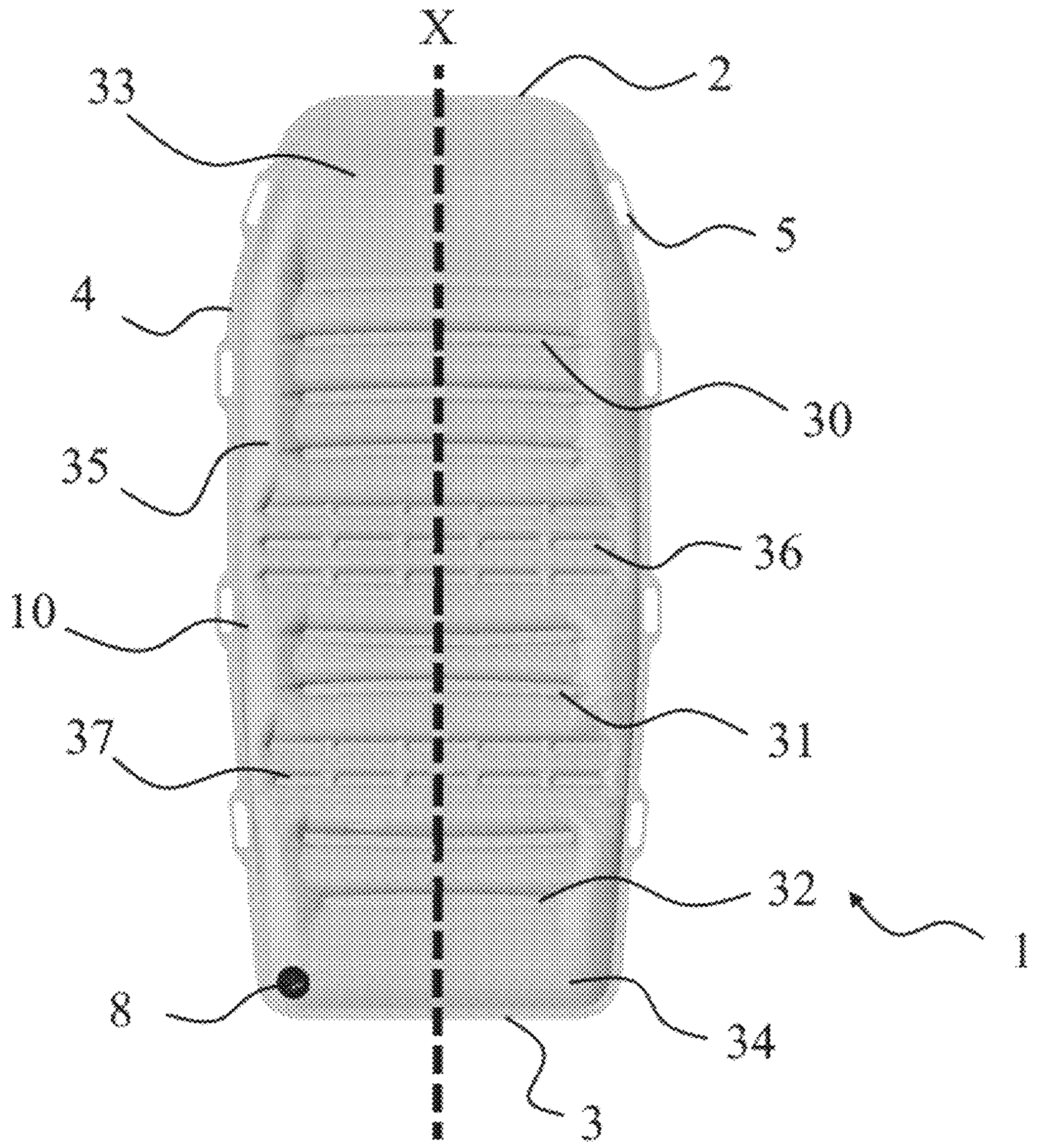
FIG. 2 is a top view of the mattress of FIG. 1.

Referring now to FIGS. 1 and 2, an inflatable mattress 1 is shown in an inflated configuration. The inflatable mattress 1 has an elongate generally rectangular shape extending along longitudinal axis X. The mattress 1 has a size sufficient for the entire body of an adult patient 40 in a supine position to be positioned on the mattress 1. In this particular embodiment the mattress has a maximum width of 95 cm and a length of 200 cm.

The mattress includes a top sheet 10 (shown in FIGS. 1 and 2) and a bottom sheet 20 (shown in FIG. 3) which has substantially the same size and shape as the top sheet 10 and is positioned underneath the top sheet 10. The top and bottom sheets 10, 20 are composed of thermoplastic polyurethane.

In this particular embodiment, the top sheet 10 and bottom sheet 20 are welded together around the perimeter 4 of the mattress 1 to define a cavity 9 (not shown in FIGS. 1-3) between the top and bottom sheets 10, 20. This bonding method simplifies the manufacturing process and reduces the risk of failure or leaks around the perimeter 4.

The mattress 1 has a head end 2 and a foot end 3. Although the mattress 1 has a generally rectangular shape, the mattress 1 tapers inwardly slightly towards the head end 2 to give a streamlined shape and to reduce the risk of the head end 2 of the mattress 1 catching or snagging on surrounding furniture or equipment during movement.

A series of handles 5 are spaced around the perimeter 4 of the mattress 1 on each long edge (i.e., the edges running generally parallel to the longitudinal axis X). In this particular embodiment there are four handles 5 spaced along each long edge, with no handles on the short edges (i.e., the edges running generally perpendicular to the longitudinal axis X). The handles 5 are formed integrally with the perimeter 4 as the top and bottom sheets 10, 20 are welded together.

A valve 8 is provided towards one corner of an upper sheet 10 towards the foot end 3. The valve 8 is positioned towards the corner at the foot end 3 to enable easy access and to minimise the risk of pumps and pipes restricting access to the patient or presenting a trip hazard for staff working around the patient.

Figure 3:
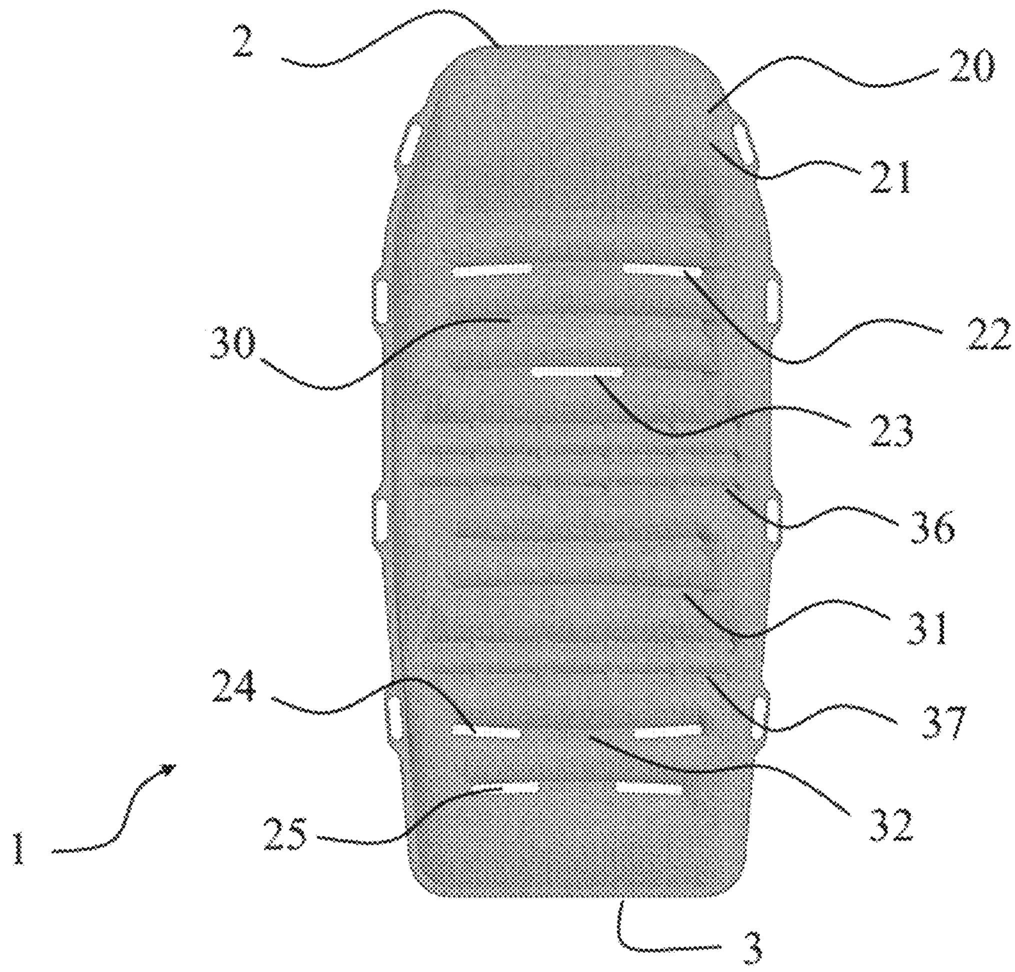
FIG. 3 is a bottom view of the mattress of FIG. 1.

With specific reference now to FIGS. 2 and 3, the mattress 1 has an array of baffles. The baffles are regions inside the perimeter 4 of the mattress 1 where the top sheet 10 and bottom sheet 20 are joined together. In this particular embodiment the top sheet 10 and bottom sheet 20 are joined together at the baffles by welding. By using the same bonding method as the perimeter 4, the baffles and perimeter 4 can be formed advantageously in a single welding step. The baffles help to retain structure in the mattress 1 when inflated.

The mattress 1 includes different types of baffles. A set of upper body support baffles 30 are arranged over a region of the mattress 1 towards the head end 2. The upper body support baffles 30 are arranged generally transversely across the mattress 1 and have a slightly concave shape. The concave shape helps to enhance the structural rigidity of the mattress 1 in the region towards the head end, making it harder to fold or bend the mattress 1 in this region when inflated. The upper body support baffles 30 are intended to support the torso of a patient in use.

In the embodiment shown in FIGS. 1-3, there are four upper body support baffles 30 which extend generally transversely and are longitudinally spaced apart. The upper body support baffles 30 are spaced apart from the head end 2 to define a pillow region 33 which is devoid of baffles. When inflated, the top sheet 10 in the pillow region 33 between the baffles 30 and the head end 2 will rise upwards above the baffles 30 to create an elevated pillow region 33 which provides additional head support for the patient.

In a central longitudinal region of the mattress, a set of hip joint baffles 36 is provided. In this particular embodiment the central longitudinal region corresponds to the central 10% of the mattress length. The set of hip joint baffles 36 is an array of smaller baffles arranged closer together (compared with the support baffles 30). In this particular embodiment, the set of hip joint baffles 36 has three rows of short transversely extending baffles, each row consisting of five substantially equally sized and spaced baffles. The three rows extend substantially perpendicular to the longitudinal axis X (i.e., substantially transversely). The hip joint baffles 36 extend almost to the perimeter 4. When inflated, the hip joint baffles 36 makes the central longitudinal region less rigid in a transverse direction and the mattress 1 can consequently be bent or folded transversely in this region. The central longitudinal region corresponds approximately with the position of a patient's hip joint. The mattress 1 can therefore be bent or folded in this region when the patient is moved between a lying and a seated position (or vice versa).

A set of knee joint baffles 37 is provided in a knee joint region of the mattress 1 between the central longitudinal region and the foot end 3. The set of knee joint baffles 37 is an array of smaller baffles arranged closer together (compared with the support baffles 30). In this particular embodiment, the set of knee joint baffles 37 has two rows of short transversely extending baffles, each row consisting of five substantially equally sized and spaced baffles. The rows extend substantially perpendicular to the longitudinal axis X. The knee joint baffles 37 extend almost to the perimeter 4. When inflated, the knee joint baffles 37 make the knee joint region less rigid in a transverse direction and the mattress 1 can consequently be bent or folded transversely in this region. The knee joint region corresponds approximately with the position of a patient's knees. The mattress 1 can therefore be bent or folded in this region when the patient is moved between a lying and a seated position (e.g., between a bed and a chair) or vice versa.

Between the hip joint baffles 36 and the knee joint baffles 37, there is a set of thigh support baffles 31. The thigh support baffles 31 are similar in size and shape to the upper body support baffles 30. The thigh support baffles 31 are arranged generally transversely across the mattress 1 and have a slightly concave shape to enhance the structural rigidity of the mattress 1. The thigh support baffles 31 are intended to support the thighs of a patient in use.

In the embodiment shown in FIGS. 1-3, there are two thigh support baffles 31 which extend generally transversely and are longitudinally spaced apart. The thigh support baffles 31 have a slightly concave shape, with the two concave edges of the two baffles 31 oriented away from each other.

Between the knee joint baffles 37 and the foot end 3, a set of calf support baffles 32 is provided. The calf support baffles 32 are similar in size and shape to the upper body and thigh support baffles 30, 31. The calf support baffles 32 are arranged generally transversely across the mattress 1 and have a slightly concave shape to enhance the structural rigidity of the mattress 1. The calf support baffles 32 are intended to support the calves of a patient in use. The calf support baffles 32 are spaced apart from the foot end 3 to define a foot support region 34 which is free from baffles. The valve 8 is positioned in the foot support region 34.

The upper body support baffles 30, thigh support baffles 31 and calf support baffles 32 do not extend to the perimeter 4 of the mattress, leaving an edge region 35 which is free from baffles. When inflated, the top sheet 10 in the edge region 35 will rise upwards above the baffles 30, 31, 32. As best illustrated in FIG. 1, this creates a low wall which partially surrounds the patient and reduces the risk of the patient rolling sideways off the mattress 1.

In the embodiment shown in FIGS. 1-3, there are two calf support baffles 32 which extend generally transversely and are longitudinally spaced apart. The calf support baffle 32 positioned closest to the foot end 3 is slightly shorter in this particular embodiment to facilitate airflow throughout the cavity 9 from the valve 8 during inflation. The calf support baffles 32 have a slightly concave shape, with the two concave edges of the two baffles 32 oriented away from each other.

With reference now to FIG. 3, an underside of the mattress 1 is shown. The bottom sheet 20 has a low-friction silicone coating 21 on the underside (i.e., outwards facing) surface. The low-friction silicone coating 21 is applied to the entire underside face of the bottom sheet 20. In use, the silicone coating 21 reduces the friction as the inflated mattress is pulled across a substrate (for example a table, bed, trolley or floor) owing to the relatively low coefficient of friction of the silicone coating 21.

The underside of the mattress 1 is provided with several grip pads. In this particular embodiment the mattress 1 has two shoulder grip pads 22, an abdomen grip pad 23, two calf grip pads 24, and two foot grip pads 25. The grip pads are affixed to the bottom sheet 20 at the baffles. In particular, the shoulder grip pads 22 and the abdomen grip pad 23 are positioned on the upper body support baffles 30, whereas the calf grip pads 24 and foot grip pads 25 are positioned on the calf support baffles 32. The grip pads 22, 23, 24, 25 are elongate and are arranged generally transversely.

The grip pads 22, 23, 24, 25 are composed of neoprene. Neoprene has a relatively high coefficient of friction and the grip pads therefore help to anchor the mattress 1 when they are in contact with a substrate.

Figure 4:
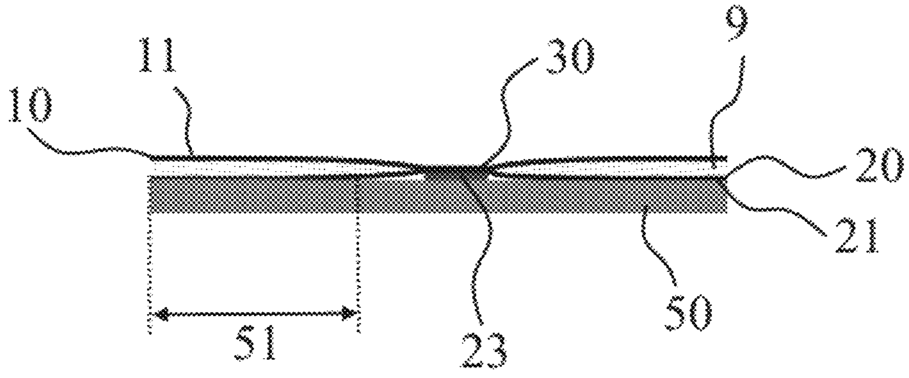
FIG. 4 is a partial cross-sectional view of a portion of the mattress of FIG. 1 around a baffle in a deflated configuration.
Figure 5:
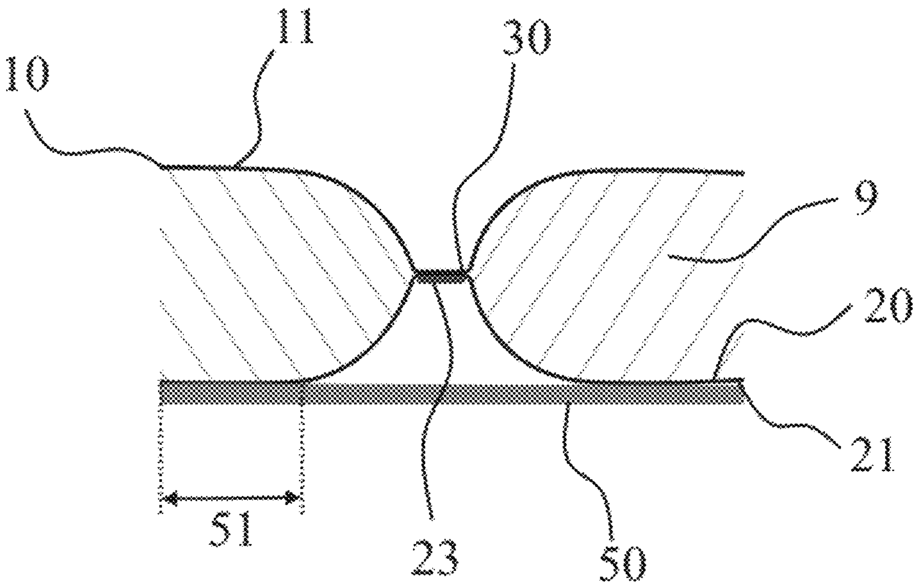
FIG. 5 is a partial cross-sectional view of a portion of the mattress of FIG. 1 around a baffle in an inflated configuration.

With reference now to FIGS. 4 and 5, a longitudinal cross-section of the mattress 1 in a region surrounding the lowermost upper body support baffle 30 (i.e., the upper body support baffle furthest from the head end 2) is shown. The top sheet 10 and bottom sheet 20 together surround a cavity 9. At the baffle 30, the top and bottom sheets 10, 20 are welded together. The abdomen grip pad 23 is provided on the bottom sheet 20 on the underside of the baffle 30. The top sheet 10 has a waterproof coating 11 over an outward facing surface.

In use, the mattress 1 will typically be placed on a substrate 50 such as a bed, table, trolley etc. When the mattress 1 is deflated as shown in FIG. 4, the grip pad 23 will contact the surface of the substrate 50. The relatively high coefficient of friction of the neoprene grip pad 23 helps to anchor the mattress 1 onto the substrate 50 and prevents the mattress 1 from being easily dragged across the substrate 50. In addition to this, a contact area 51 of the bottom sheet 20 is in contact with the substrate 50 increases friction (despite the low friction coating 21). This helps to ensure the mattress 1 remains in place and does not slide around underneath a patient when deflated. Consequently, the mattress 1 can be safely left underneath a patient during a procedure or examination. This saves the time taken to remove the mattress 1 after the patient has been transferred to an operating or examination table, and to replace it after the procedure.

When the mattress 1 is inflated (as shown in FIG. 5) the cavity 9 either side of the baffle 30 expands, lifting the baffle 30 up and away from the substrate 50. The grip pad 23 is also lifted away from the substrate 50. In addition to this, the contact area 51 of the bottom sheet 20 is significantly reduced compared to when the mattress 1 is deflated. These two factors together significantly reduce the friction resistance, enabling the mattress 1 and patient to be dragged across the substrate 50 without excessive effort.

Figure 6:
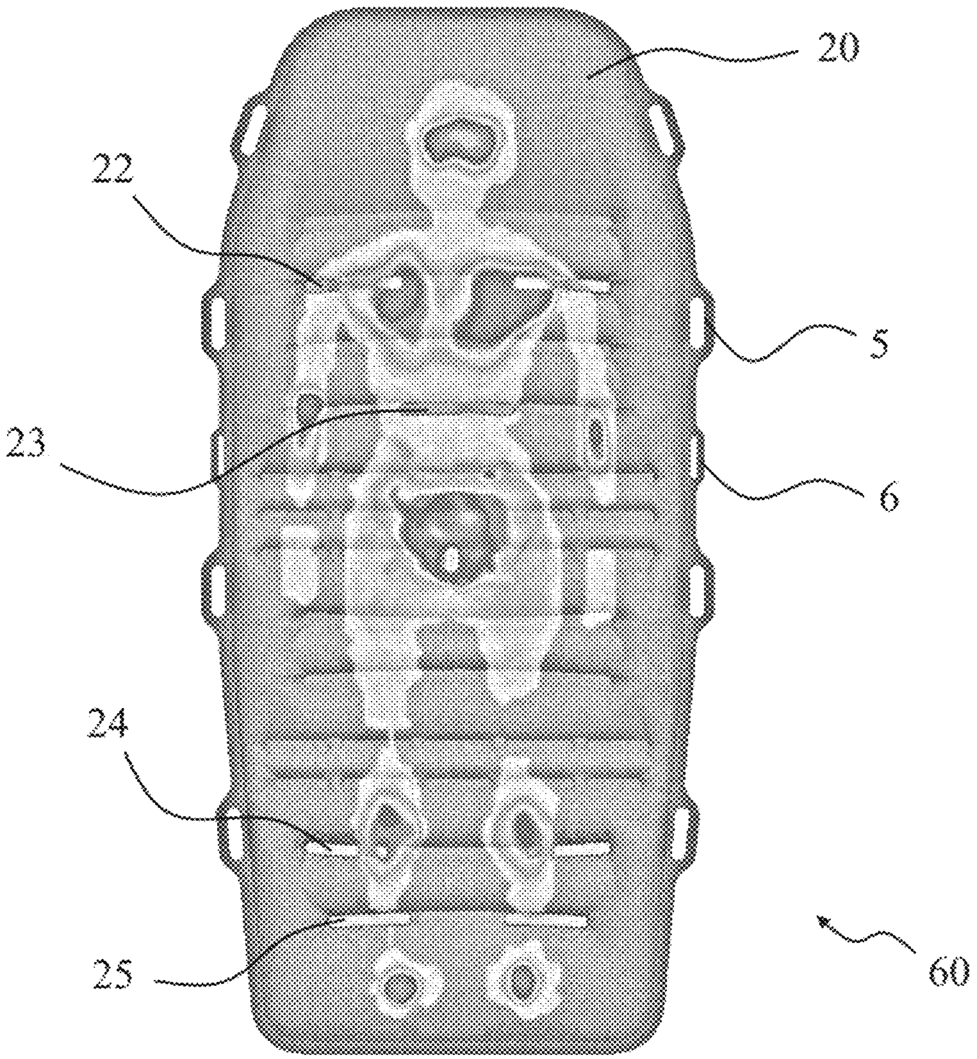
FIG. 6 shows a heat map superimposed on the bottom side of a second non-limiting embodiment of a transfer mattress according to the present disclosure showing the high mass points of a typical patient.
Figure 7:
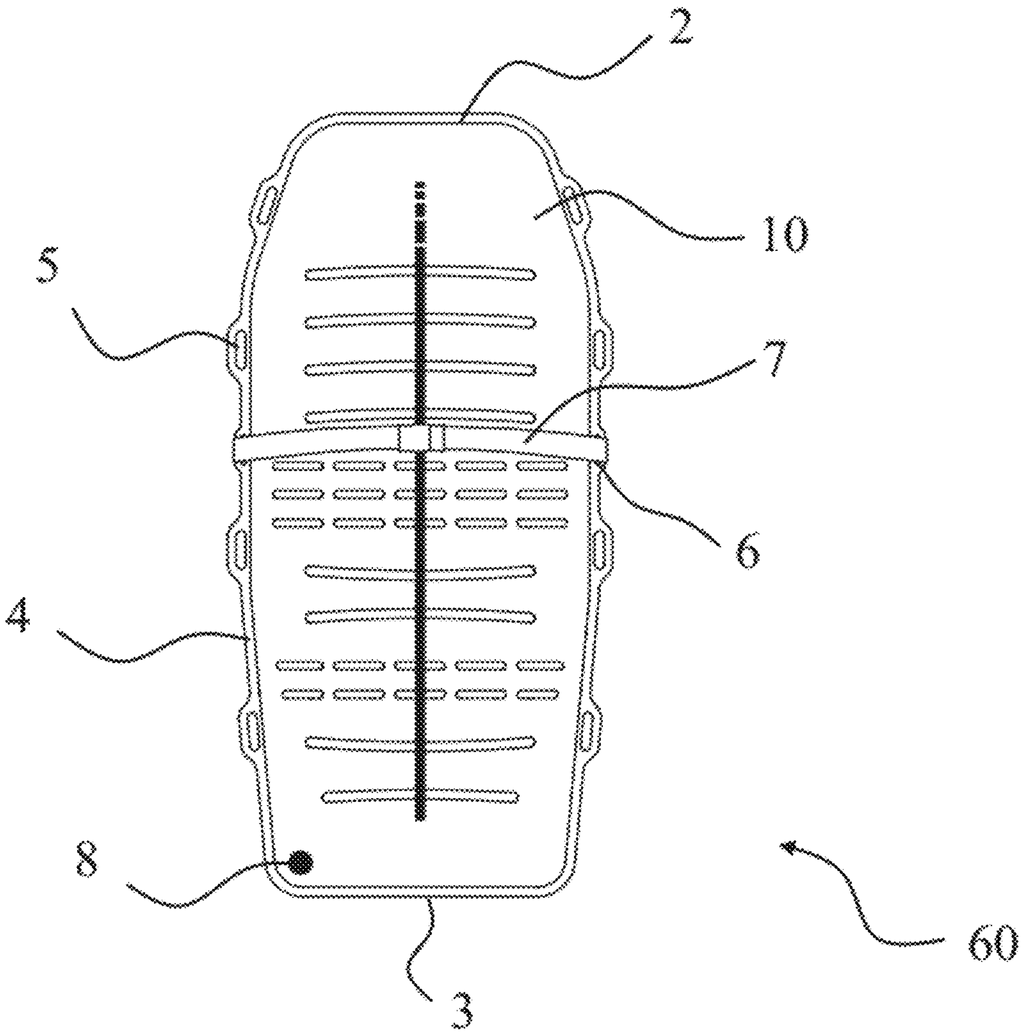
FIG. 7 is a top view of the mattress of FIG. 6 when deflated, with a restraining strap in position.

With reference now to FIGS. 6 and 7, another mattress 60 is shown. The mattress 60 is very similar to the mattress 1 and is of a similar size and shape with the same general construction and the same arrangement of handles 5, baffles, grip pads and valve 8. However, the mattress 60 is additionally provided with a set of strap loops 6 around the perimeter 4 on either side of a torso region adjacent to the hip joint baffles 36. The strap loops 6 and handles 5 are formed integrally in the perimeter 4 of the mattress 60 as the top and bottom sheets 10, 20 are welded together. As shown in FIG. 7, a restraining strap 7 can be fed through the loops 6. The restraining strap 7 can be used as required to restrain and/or secure the patient during transport to reduce the risk of the patient rolling off or falling from the mattress 60.

Referring again to FIG. 6, a heat map is superimposed onto the bottom sheet 20 for illustration. This heat map shows the high mass points of a typical adult patient when lying on the mattress 60. The grip pads 22, 23, 24, 25 are positioned within baffles at or close to the high mass points. For example, the shoulder grip pads 22 are positioned around high mass points around the shoulders. The calf grip pads 24 are positioned around high mass points around the calves. By strategically positioning the grip pads at or near points where the mass of the patient on the mattress 1 is highest, the grip pads are more effective at anchoring the mattress 60 to the substrate 50 when the mattress 60 is deflated.

The mattresses 1 and 60 were formed by taking two similarly sized thermoplastic polyurethane sheets, applying a silicone coating 21 to one side of a first sheet to form the bottom sheet 20, applying a waterproof coating 11 to one side of the second sheet to form a top sheet 10, and implanting a valve 8 into the top sheet 10 towards a foot end corner. The top sheet 10 was then laid over the bottom sheet 20 with the waterproof coating 11 and silicone coating 21 facing outwards. The two sheets were then cut to shape, and then welded together around a perimeter 4 and at the baffles by high frequency welding to form the cavity 9, handles 5 and strap loops 6 (for the mattress 60). By welding the top and bottom sheets 10, 20 together around the perimeter 4 and at the baffles in a single step, production of the mattress 1 is simplified, rapid and low cost and requires no stitching.

In use, mattress 1 (in a deflated configuration) is placed on a substrate 50 such as a bed, table, trolley etc. A patient 40 then lays or is assisted to lie on the top sheet 10 with their head towards the head end 2 and their feet towards the foot end 3. To move the patient 40, a pump is attached to the valve 8 and air is forced into the cavity 9 to inflate the mattress 1. This raises the top sheet 10 away from the bottom sheet 20 (except at the baffles), lifting the patient 40 away from the substrate 50. At the same time, the grip pads are lifted out of contact with the substrate 50 and the contact area 51 of the bottom sheet 20 on the substrate 50 is reduced. This decreases friction between the mattress 1 and the substrate 50. Staff can then use the handles 5 to pull or push the mattress 1 across the substrate 50 or between the substrate 50 and another surface. When the patient 40 has been repositioned, the valve 8 is opened to allow air to escape from the cavity 9 and the mattress 1 is deflated. This brings the grip pads into contact with the substrate 50 and increases the contact area 51 of the bottom sheet 20 on the substrate 50. This anchors the mattress 1 to the substrate 50. The patient 40 can then safely leave the mattress 1 or be assisted to leave the mattress 1. Alternatively, a procedure can be performed on the patient 40 whilst they remain on the deflated mattress 1.

Figure 8:
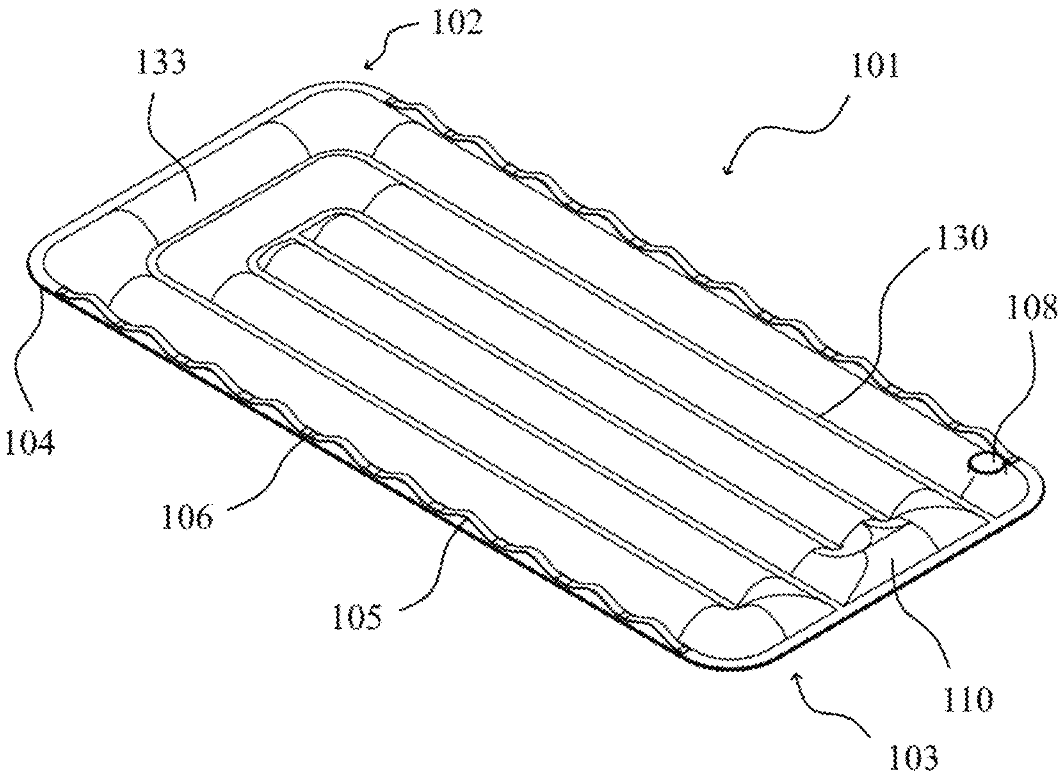
FIG. 8 is a perspective view of a third non-limiting embodiment of a transfer mattress according to the present disclosure in an inflated configuration.

With reference now to FIG. 8, another transfer mattress 101 is shown. The transfer mattress 101 is elongate and is generally rectangular in shape with a head end 102, a foot end 103 and a perimeter 104. The mattress 101 has a size sufficient for the entire body of an adult patient in a supine position to be positioned on the mattress 101. In this particular embodiment the mattress has a maximum inflated width of 100 cm and a length of 210 cm.

The mattress includes a top sheet 110 (shown in FIGS. 8 and 9) and a bottom sheet 120 (shown in FIG. 11) which has substantially the same size and shape as the top sheet 110 and is positioned underneath the top sheet 110. The top and bottom sheets 110, 120 are composed of thermoplastic polyurethane.

Figure 11:
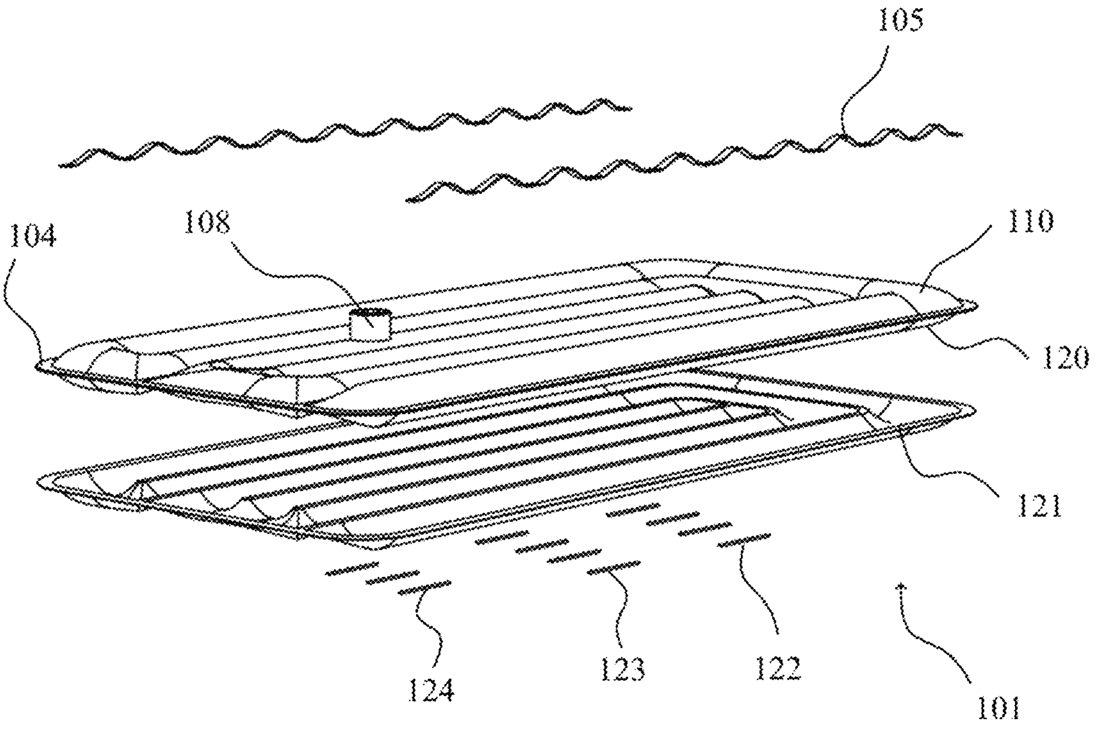
FIG. 11 is an exploded perspective view of the mattress of FIG. 8.

As best illustrated in FIG. 11, the top sheet 110 and bottom sheet 120 are welded together around the perimeter 104 of the mattress 101 to define an inflatable cavity 109 (not visible) between the top and bottom sheets 110, 120. This bonding method simplifies the manufacturing process and reduces the risk of failure or leaks around the perimeter 4.

Figure 9:
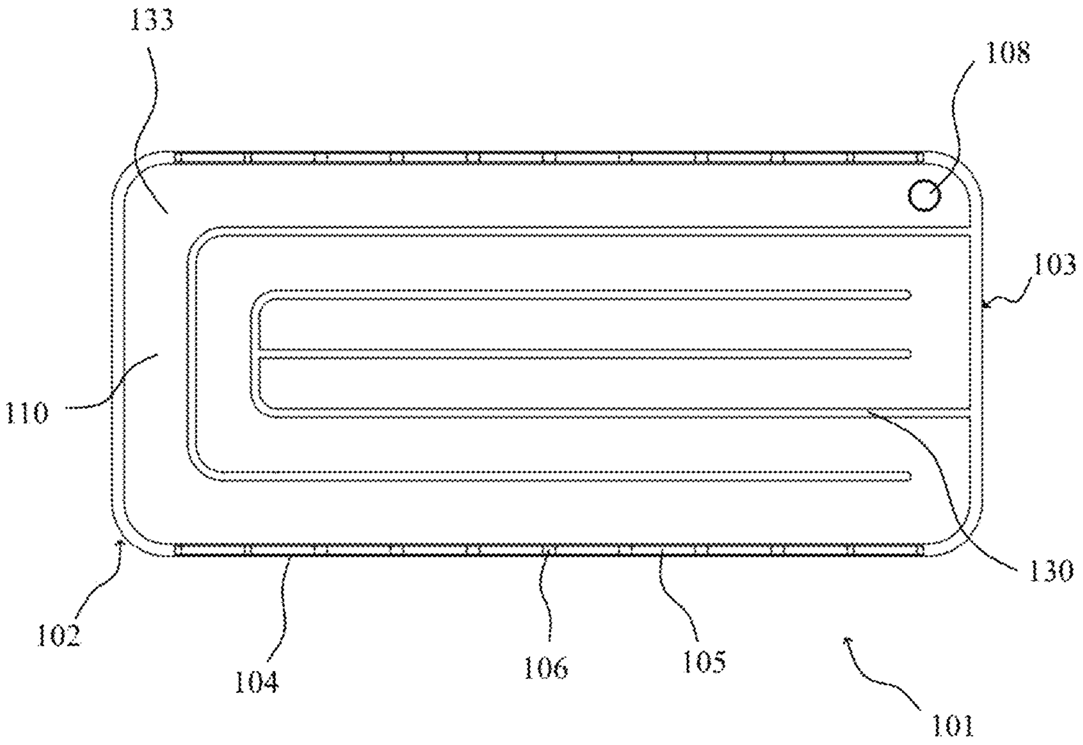
FIG. 9 is a top view of the mattress of FIG. 8.

With reference now to FIGS. 8 and 9, a handle strip 105 is positioned along each longitudinal edge of the mattress 101. The handle strips 105 are composed of a webbing material to provide extra strength. The handle strips 105 are stitched to the top sheet 110 at the perimeter 104 at discrete, longitudinally spaced points 106 to define multiple grippable handle portions along each longitudinal edge of the mattress 101 as shown in FIG. 8.

A valve 108 is provided towards one corner of an upper sheet 110 towards the foot end 103. The valve 108 is positioned towards the corner at the foot end 103 to enable easy access and to minimise the risk of pumps and pipes restricting access to the patient or presenting a trip hazard for staff working around the patient.

Figure 10:
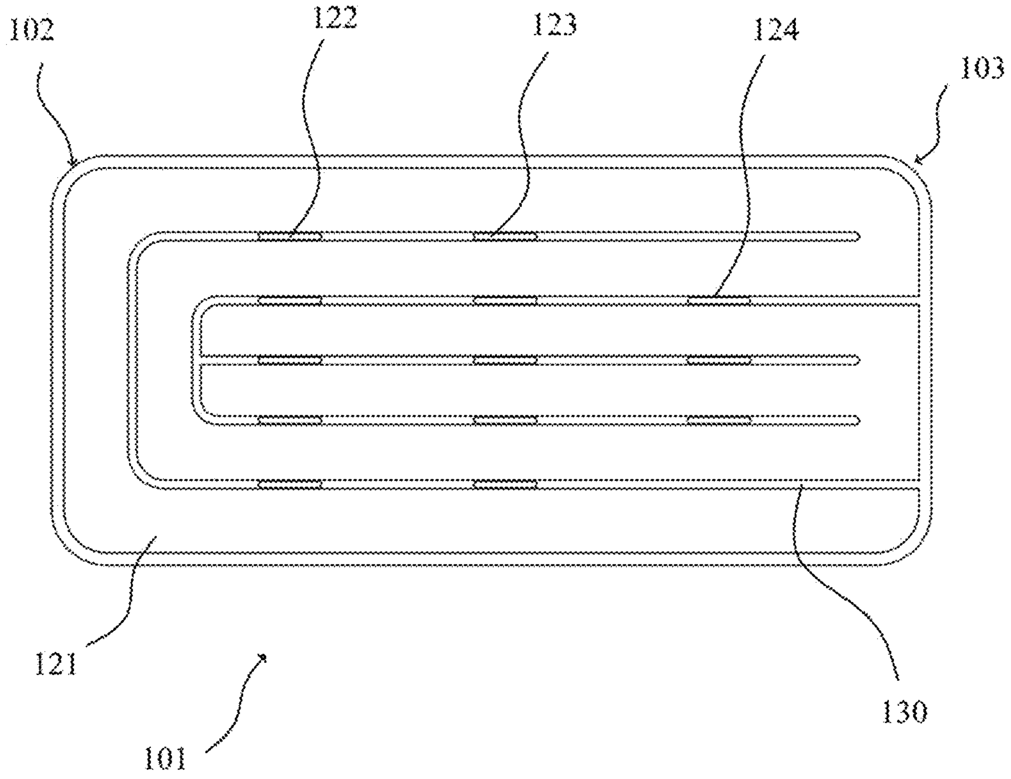
FIG. 10 is a bottom view of the mattress of FIG. 8.

With reference now to FIGS. 8, 9 and 10, the mattress 101 has an array of baffles 130. The baffles 130 are regions inside the perimeter 104 of the mattress 101 where the top sheet 110 and bottom sheet 120 are joined together, in this particular embodiment by welding. The baffles 130 help to retain structure in the mattress 101 when inflated. Unlike the mattress 1 of FIGS. 1-5, the baffles 130 of the mattress 101 extend generally longitudinally, with some transverse extend towards the head end 102 in a pillow region 133. The baffles 130 are configured such that the cavity 109 is not partitioned into more than one plenum chamber, i.e., the entire cavity can be inflated and deflated via the valve 108.

With reference now to FIGS. 10 and 11, a cover sheet 121 is positioned underneath and attached to the bottom sheet 120. The cover sheet 121 is composed of a low-friction silicone material. The cover sheet is stitched to the bottom sheet 120 around the perimeter 104 and along the longitudinal baffles 130. In use, the low-friction silicone material of the cover sheet 121 reduces the friction as the inflated mattress is pulled across a substrate (for example a table, bed, trolley or floor) owing to the relatively low coefficient of friction of silicone.

The underside of the mattress 101 is provided with several neoprene grip pads 122, 123, 124. The grip pads are positioned within the longitudinal baffles 130 roughly corresponding to the position of a patient's shoulders, abdomen and calves. In this particular embodiment the mattress 101 has four shoulder grip pads 122, four abdomen grip pads 123 and three calf grip pads 124. The grip pads are affixed to the cover sheet 121 along the baffles 130. The grip pads 122, 123, 124 are elongate and are arranged generally longitudinally. The grip pads 122, 123, 124 function in essentially the same manner as the grip pads 22, 23, 24.

The mattress 101 was formed by taking two similarly sized thermoplastic polyurethane sheets and implanting a valve 108 into one of the sheets towards a foot end corner to form a top sheet 110. The top sheet 110 was then laid over the other sheet (bottom sheet 120), the two sheets were cut to shape, and then welded together around a perimeter 104 and at the baffles 130 by high frequency welding to form a cavity 109. A silicone cover sheet 121 was then attached to the bottom sheet 120 by stitching around the perimeter 104 and at the baffles 130. Neoprene grip pads 122, 123, 124 were then affixed at the baffles 130 to the cover sheet 121. Handle strips 105 were then stitched to the perimeter 104 at multiple points 106 along each longitudinal edge of the mattress 101.

In use, the mattress 101 (in a deflated configuration) is placed on a substrate such as a bed, table, trolley etc. A patient then lays or is assisted to lie on the top sheet 110 with their head towards the head end 102 and their feet towards the foot end 103. To move the patient, a pump is attached to the valve 108 and air is forced into the cavity 109 to inflate the mattress 101. This raises the top sheet 110 away from the bottom sheet 120 and cover sheet 121 (except at the baffles 130), lifting the patient away from the substrate. At the same time, the grip pads 122, 123, 124 are lifted out of contact with the substrate and the contact area of the cover sheet 121 on the substrate is reduced. This decreases friction between the mattress 101 and the substrate. Staff can then use the handles 105 to pull or push the mattress 101 across the substrate or between the substrate and another surface. When the patient has been repositioned, the valve 108 is opened to allow air to escape from the cavity 109 and the mattress 101 is deflated. This brings the grip pads 122, 123, 124 into contact with the substrate and increases the contact area of the cover sheet 121 on the substrate. This anchors the mattress 101 to the substrate. The patient can then safely leave the mattress 101 or be assisted to leave the mattress 101. Alternatively, a procedure can be performed on the patient whilst they remain on the deflated mattress 101.

What is claimed is:

1. An inflatable mattress for patient transfer, the inflatable mattress comprising:

an elongate top sheet having a head end, a foot end, and a longitudinal axis extending therebetween;

an elongate bottom sheet having substantially the same size as the top sheet and positioned adjacent to the top sheet, wherein the top and bottom sheets are joined around their perimeter to define a cavity between the top and bottom sheets; and a valve in fluid communication with the cavity, wherein the valve includes a port on an external surface of the mattress to enable the cavity to be inflated or deflated;

a low friction material provided on or adjacent at least a portion of an outwards facing surface of the bottom sheet; and one or more grip pads composed of a high friction material disposed on the outwards facing surface of the bottom sheet;

one or more baffles, wherein the baffles are formed in regions where the top and bottom sheets are joined within the cavity; and wherein the grip pads are positioned on or adjacent to the one or more baffles such that when the mattress is positioned with the bottom sheet contacting a substrate, the grip pads contact the substrate when the mattress is deflated and do not contact the substrate when the mattress is inflated.

2. The inflatable mattress of claim 1, wherein the baffles are elongate and extend in a generally transverse direction.

3. The inflatable mattress of claim 1, wherein the top sheet and bottom sheet are welded together at the baffles.

4. The inflatable mattress of claim 1, further comprising at least one of:

a set of hip joint baffles in a hip joint area approximately equidistant between the head and foot ends, wherein the set of hip joint baffles comprises one or more rows of transversely oriented baffles; and/or a set of knee joint baffles in a knee area, wherein the set of knee joint baffles comprises one or more rows of transversely oriented baffles.

5. The inflatable mattress of claim 4, wherein each row has a transverse extent of between 75% and 95% of a mattress width.

6. The inflatable mattress of claim 1, further comprising one or more support baffles extending generally transversely across the mattress.

7. The mattress of claim 6, wherein the support baffles have a transverse extent of between 50% and 80% of a mattress width.

8. The inflatable mattress of claim 1, wherein the baffles are elongate and extend in a generally longitudinal direction.

9. The inflatable mattress of claim 1, wherein the low friction material is provided on a cover sheet which is attached to and covers at least a portion of the bottom sheet.

10. The mattress of claim 1, wherein the low friction material is selected from a group consisting of polytetrafluoroethylene (PTFE), fluorinated ethylene propylene (FEP), and silicone.

11. The inflatable mattress of claim 1, wherein the grip pads are positioned to be directly underneath or near high mass points of a patient supine on the mattress.

12. The inflatable mattress of claim 1, wherein the top and bottom sheets are attached directly to each other around the perimeter and at the baffles.

13. The inflatable mattress of claim 1, wherein the top and bottom sheets are composed of a material selected from a group consisting of polyvinyl chloride, polyethylene, polypropylene, polyurethane, thermoplastic polyurethane, synthetic rubber, and natural rubber.

14. The inflatable mattress of claim 1, wherein the valve is provided in the top sheet towards a foot end corner, and wherein the top sheet includes additional reinforcing material around the valve.

15. The inflatable mattress of claim 1, further comprising one or more handles arranged around the perimeter.

16. The inflatable mattress of claim 1, further comprising one or more pairs of restraining strap loops provided around a perimeter of the mattress to receive and attach restraining straps.

17. A method of forming inflatable mattress for patient transfer of claim 1, the method comprising the steps of:

obtaining the elongate top sheet and the elongate bottom sheet, wherein the top and bottom sheets are similarly sized sheets of flexible rubber or thermoplastic material;

applying a low-friction coating to one side of the bottom sheet;

implanting a valve into the top sheet;

overlaying the top sheet on the bottom sheet such that the coated side of the bottom sheet is oriented away from the top sheet;

cutting both the top and bottom sheets to a desired shape;

welding the top and bottom sheets together around a perimeter and at one or more baffles to form a cavity between the two sheets; and affixing grip pads to the bottom sheet at the baffles.

18. A method for forming an inflatable mattress for patient transfer of claim 1, the method comprising the steps of:

obtaining the elongate top sheet and the elongate bottom sheet, wherein the top and bottom sheets are similarly sized sheets of flexible rubber or thermoplastic material;

implanting a valve into the top sheet;

overlaying the top sheet and the bottom sheet;

cutting both the top and bottom sheets to a desired shape;

welding the two sheets together around a perimeter and at one or more baffles to form an inflatable pad having a cavity between the two sheets;

affixing grip pads to the bottom sheet at the baffles;

positioning a cover sheet comprising a low friction material over an outward facing surface of the bottom sheet; and stitching the cover sheet to the inflatable pad around a perimeter and at the one or more baffles.

19. A method for moving a patient, the method comprising the steps of:

placing the inflatable mattress according to claim 1 on a substrate;

positioning a patient on the top sheet of the mattress with a head of the patient towards the head end and feet of the patient towards the foot end;

inflating the cavity by forcing air in through the valve;

repositioning the mattress and patient by pulling or pushing the mattress across the substrate or between the substrate and another surface; and opening the valve to deflate the mattress once the patient has been moved to the desired position.

20. The inflatable mattress of claim 6, wherein the support baffles have a curved shape.

* * * * *